US005743020A

United States Patent [19]
Sheldon

[11] Patent Number: 5,743,020
[45] Date of Patent: Apr. 28, 1998

[54] THREE-AXIS CONTINUOUS PROBE

[76] Inventor: Paul C. Sheldon, 10100 N. Sheridan Dr., Mequon, Wis. 53092

[21] Appl. No.: 722,363

[22] Filed: Sep. 27, 1996

[51] Int. Cl.$^6$ .................................................. G01B 5/00
[52] U.S. Cl. ..................................................... 33/559
[58] Field of Search ................................ 73/865.8, 105; 33/556–561, 359

[56] References Cited

U.S. PATENT DOCUMENTS

| | | | |
|---|---|---|---|
| 3,869,799 | 3/1975 | Neuer et al. | 33/561 |
| 4,078,314 | 3/1978 | McMurtry | 33/557 |
| 4,716,656 | 1/1988 | Maddock et al. | 33/559 |
| 4,879,916 | 11/1989 | Juillerat | 73/865.8 |
| 5,390,424 | 2/1995 | Butter et al. | |
| 5,505,005 | 4/1996 | McMurtry et al. | |

OTHER PUBLICATIONS

Jean–Pierre Merlet, published on the Internet at http://www.inria.fr/prisme/personnel/merlet/merlet eng.html, § Parallel manipulators, drawings and references for *Manipulateurs a 3 degres de liberte*, not dated.

*Primary Examiner*—R. Raevis
*Attorney, Agent, or Firm*—Robert A. Van Someren

[57] ABSTRACT

A three-axis continuous, sensor device, such as a probe, includes a base structure and a stylus supporting member. The base structure and stylus supporting member are connected by three control arms that limit movement of the stylus supporting member relative to the base structure to movement along the three linear axes. Each control arm includes a pair of four-bar parallel linkages connected in series. Three sensor legs also are connected between the base structure and the stylus supporting member to sense movement of one with respect to the other.

13 Claims, 7 Drawing Sheets

THREE-AXIS CONTINUOUS PROBE

FIELD OF THE INVENTION

The present invention relates generally to a three-axis, continuous sensing device, such as a sensing probe of the type used on a coordinate positioning machine, and particularly to a device able to sense relative movement of two structures along three linear axes.

BACKGROUND OF THE INVENTION

A variety of touch probes are used with coordinate positioning machines, such as coordinate measuring machines or machine tools, to measure a position on or along a surface, e.g., a workpiece surface. There are many coordinate positioning machine designs, but such machines typically include a moveable arm to which the probe is attached. The arm is supported for movement relative to a datum, such as a platform or table on which a workpiece is supported. This allows an operator to use the coordinate positioning machine in combination with the probe to determine whether certain positions on the workpiece are at their proper location relative to the structure on which the workpiece is supported.

Some probes, such as touch probes, are designed to produce a signal when the stylus carried by the probe contacts a surface. This type of probe includes a fixed structure that is mounted to the moveable arm of the coordinate positioning machine. A stylus structure is supported on the fixed structure at several locations. For example, the stylus structure may include three balls biased against a contact surface of the fixed structure. In some designs, the balls and contact surfaces are part of a circuit which is broken when the stylus contacts an object and one of the balls is forced away from the contact surface. When the circuit is broken, a signal is provided to indicate the contact between the stylus and the object. In other probes, the stylus support structure is connected to a strain sensor that provides a signal when strain is induced via contact of the stylus with an object.

With these types of probes, it is critical that the stylus be moved back to a precise and repeatable rest position after contact with an object. Sometimes grooves are formed in the contact surface to assist in precisely reseating the balls after deflection of the stylus. Without this precise reseating of the stylus support structure, the position of the stylus would be different for each subsequent measurement of position, and errors would be introduced into the measurement.

It often is difficult maintain a mechanically repeatable rest position, because wear can result due to the repeated contact between the balls and the contact surface and due to the electrical current that can degrade electrical contacts. Also, slow, careful contact is necessary to obtain an accurate measurement of the point at which the stylus contacted the object. In fact, the required sensitivity may be so great it is sometimes necessary to adjust the amount of force biasing the stylus support structure back to its rest position when different styli are interchanged.

Attempts have been made to design probes able to measure movement of the stylus after contact with an object. If this movement can be measured, then it is a straightforward mathematical calculation to determine the location of the stylus prior to movement and thus the precise point of contact with the object being measured, obviating the need for a precise mechanically repeatable rest position. In any linear three-axis probe, movement of the stylus supporting member must be accurately constrained to movement along the three linear axes, otherwise errors are introduced that prohibit the probe from accurate sensing of positions. However, a stylus, like any object, potentially can be moved with six degrees of freedom. Without restraint, the stylus can be moved along the linear axes x, y and z, but it can also be moved along the rotational axes, commonly known as the a-axis, b-axis, and c-axis. The a, b and c axes represent rotational movement of an object about the x, y and z axes respectively. Although movement could be sensed along all six axes, it is often necessary or desirable to measure movement along only the three linear axes. Existing three-axis probes use a complex arrangement of slides and plane surfaces to permit movement of the stylus solely along the three linear axes.

It would be advantageous to provide a three-axis sensor device having a rigid, reliable and relatively simple construction to indicate position and track movement of a stylus along the three linear axes. It would also be advantageous to have a sensor device that could continually sense the relative motion between two objects.

SUMMARY OF THE INVENTION

The preferred embodiment of the present invention features a three-axis continuous probe for use with a coordinate positioning machine having a moveable arm. The probe comprises a base structure by which the probe may be mounted to the moveable arm and a stylus supporting member to which a stylus may be attached. A mechanical control system is connected between the base structure and the stylus supporting member to limit movement of the stylus supporting member relative to the base structure along the three linear axes. The control system includes at least one control arm connected to both the stylus supporting member and the base structure. A sensor assembly cooperates with the base structure and the stylus supporting member to sense movement of the stylus supporting member relative to the base structure when the base structure contacts or is dragged along the surface of a workpiece.

In a more specific embodiment of the invention, there are three control arms, and each control is connected to both the base structure and the stylus supporting member. The control arms each include at least one four-bar linkage, and preferably a pair of four-bar linkages connected in series, to prevent unwanted rotational movement of the stylus supporting member with respect to the base structure.

According to a futher aspect of the invention, a sensor device is provided for measuring relative movement between two objects. The sensor device includes a base structure and a supporting member that may be connected to a second structure. At least one control arm is connected at a first end to the base structure and at a second end to the supporting member. The control arm includes a pair of four bar linkages connected in series. A sensor system that may include a plurality of linearly extensible sensors is positioned to detect when the supporting member is moved relative to the base structure. This permits the movement of the second structure to be tracked continuously as it is moved relative to the base structure or some other reference structure to which the base structure is mounted or formed integrally therewith.

According to another aspect of the invention, a method is provided for preparing a three-axis continuous probe for use on a coordinate positioning machine having a moveable arm. The method comprises the steps of preparing a base structure that may be mounted to the moveable arm and preparing a stylus supporting member. The method further includes connecting the stylus supporting member to the base structure by a plurality of control arms. The control arms are designed to limit movement of the stylus supporting member relative to the base structure to movement along the three linear axes.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
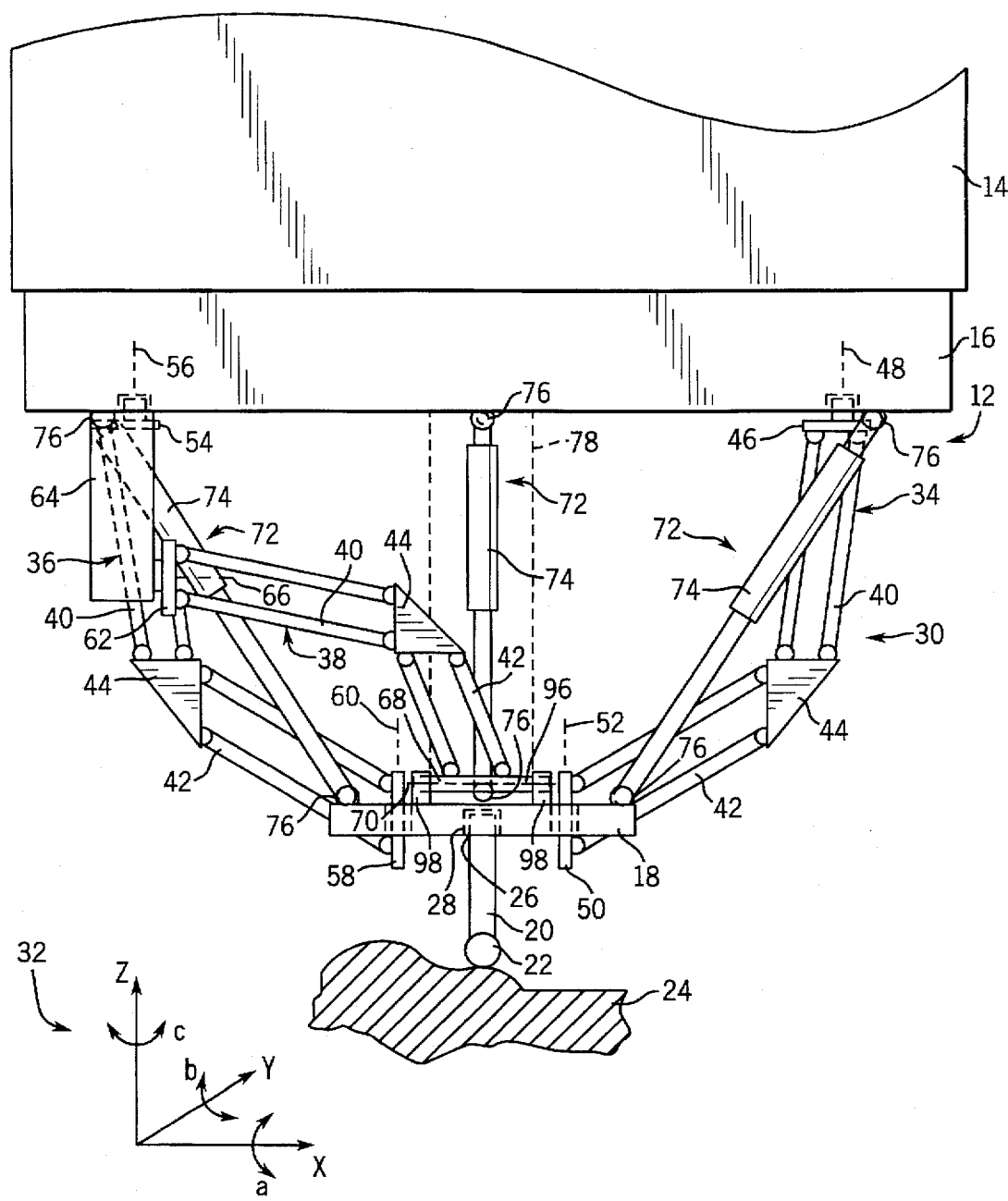
FIG. 1 is a front view of a three-axis continuous probe according to a preferred embodiment of the present invention.
Figure 2:
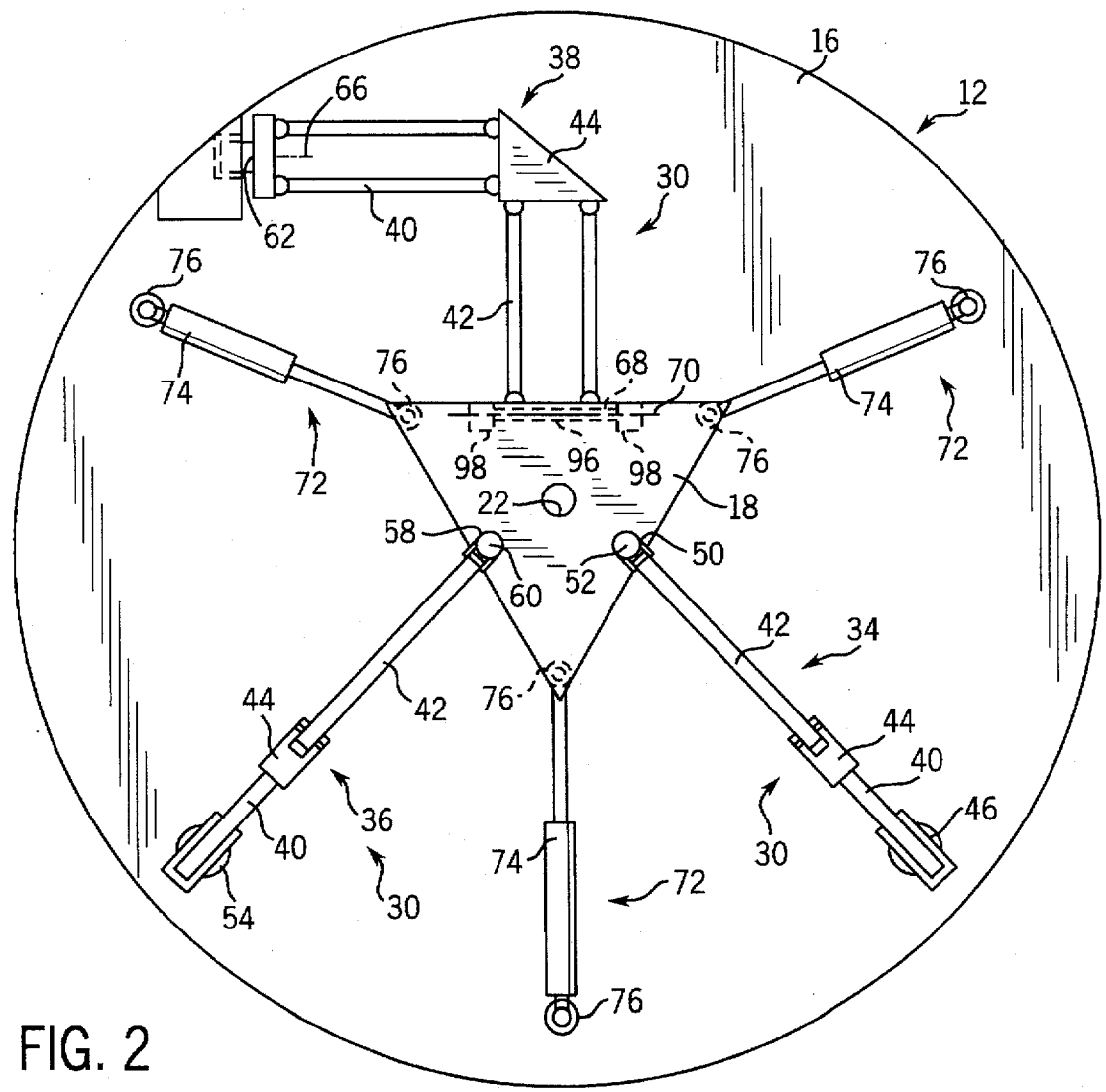
FIG. 2 is a bottom view of the three-axis probe according to a preferred embodiment of the present invention.

Referring generally to FIGS. 1 and 2, a three-axis continuous, sensor device, such as a probe 12, is illustrated. Probe 12 can be used with a variety of coordinate positioning machines, such as coordinate measurement machines or machine tools. Typically, such machines include a moveable arm 14 to which probe 12 may be attached in a conventional manner.

Probe 12 includes a base structure 16 that may be mounted to moveable arm 14. Preferrably, base structure 16 is configured for removeable mounting to arm 14 by, for instance, any of a variety of ways known to those or ordinary skill in the art. Probe 12 also includes a stylus supporting member 18 designed to securely hold a stylus 20. Stylus 20 includes a sensing tip 22 that can be moved into contact with a workpiece 24. Preferably, stylus 20 is replaceable and removeably attached to stylus supporting member 18 by, for example, a threaded portion 26 received in a threaded bore 28 of stylus supporting member 18.

Stylus supporting member 18 is connected to base structure 16 by a mechanical control system 30. Control system 30 limits the movement of stylus supporting member 18 with respect to base structure 16 to only three degrees of freedom as defined by the three linear axes x, y and z. As previously mentioned, an object, such as stylus supporting member and its attached stylus 20, potentially can move with six degrees of freedom defined by the three linear axes x, y and z and the three rotational axes a, b, c, as illustrated by a diagram 32 in FIG. 1. Control system 30 restricts stylus supporting member 18 from any twisting or rotational movement along rotational axes, a, b or c.

Control system 30 includes at least one control arm and preferably three control arms 34, 36, and 38. In the embodiment illustrated, each of the control arms 34, 36 and 38 includes a first four bar linkage 40 and a second four bar linkage 42 connected in series by an attachment bracket 44.

Control arm 34 includes a first end 46 pivotably mounted to base structure 16 for rotational movement with a single degree of freedom about an axis 48. Control arm 34 also includes a second end 50 pivotably mounted to stylus supporting member 18 for rotational motion with one degree of freedom about an axis 52. Similarly, control arm 36 includes a first end 54 pivotably mounted to base structure 16 for rotation with one degree of freedom about an axis 56. Control arm 36 also includes a second end 58 pivotably mounted to stylus supporting member 18 for rotational movement with one degree of freedom about an axis 60. It is preferred that axes 48, 52, 56, and 60 be oriented substantially parallel to one another. Further, control arm 38 includes a first end 62 pivotably mounted to base structure 16 by a mounting block 64 for rotational movement with one degree of freedom about an axis 66. Control arm 38 also includes a second end 68 pivotably mounted to stylus support member 18 for rotational movement with one degree of freedom about an axis 70. As illustrated, axis 70 is oriented in a transverse direction with respect to axes 52 and 60 while being substantially parallel with axis 66.

When stylus 20 is brought into contact with or dragged along the surface of workpiece 24, control arms 34, 36 and 38 cooperate to prevent any rotational movement of stylus support member 18, and thus stylus 20. In other words, stylus support member 18 and stylus 20 only can be moved through space with three degrees of freedom defined by linear axes x, y and z. Any twisting, i.e., rotational, movement of stylus support member 18 along rotational axis a, b or c is restricted by the control arms. Specifically, control arms 34 and 36 extend from stylus supporting member 18 at selected angles with respect to one another to prevent rotational motion along both the a-axis and the b-axis. Control arm 38 is oriented, as illustrated, to prevent movement along the rotational c-axis. As will be explained more fully below, the use of four bar linkages having pairs of equal length parallel bars, insures that any forces acting on stylus 20 and stylus supporting member 18 are received solely in tension or compression by the parallel bars. This provides a lightweight mechanism that permits rapid movement of stylus supporting member 18 while providing rigid resistance to any twisting of stylus support member 18.

A sensor assembly 72 cooperates with base structure 16 and stylus supporting member 18 to sense movement of the stylus supporting member relative to the base structure. In the illustrated embodiment, sensor assembly 72 includes three sensor legs 74 with each leg being pivotably connected to both base structure 16 and stylus supporting member 18 by pivot joints 76, such as ball and socket joints. In the illustrated embodiment, each leg 74 is an extensible sensor, such as an LVDT, that has a pair of components slidable engaged. Legs 74 could also incorporate readheads and linear scales to sense the amount of extension of each leg. Alternatively, sensors, such as encoders, could be connected to multiple pivot joints on select legs or to at least one pivot joint 76 on each leg 74 to determine the angle of the leg and thus the exact position of each leg 74.

Legs 74 can be connected between base structure 16 and stylus supporting member 18 in several different orientations. However, a preferred orientation is best illustrated in FIG. 2 in which legs 74 are connected to stylus supporting member 18 at points generally forming an equilateral triangle. The opposite ends of legs 74 are connected to base structure 16 at three distinct points that form a triangle, preferably an equilateral triangle larger than the equilateral triangle formed on stylus supporting member 18.

Sensor assembly 72 senses the movement of stylus supporting member 18 with respect to base structure 16. Ultimately, sensor assembly 72 tracks the movement of sensing tip 22 relative to a datum, such as a point on the fixture or platform to which workpiece 24 is mounted. This is possible because the position of moveable arm 14 (and thus base structure 16) is tracked relative to the datum by the coordinate positioning machine.

Specifically, each sensor leg 74 is capable of providing a signal indicative of the distance between its ends and thus between its points of attachment to base structure 16 and stylus supporting member 18, respectively. The combination of signals from all three sensor legs 74 is used to mathematically calculate the exact position and movement of sensing tip 22 relative to the desired datum. Thus, when sensing tip 22 contacts workpiece 24 and moves, this movement is measured along three linear axes, and the exact position at which sensing tip 22 first contacted workpiece 24 can be calculated, typically by a computer. Futher, it is not necessary to track rotational movement along axes a, b and c, because control arms 34, 36 and 38 prevent any such movement.

Stylus supporting member 18 is biased to a position away from base structure 16 by a resilient member 78, shown in dashed lines. Resilient member 78 can comprise a piece of foam rubber disposed in contact with base structure 16 and stylus supporting member 18 between control arms 34, 36 and 38. Other resilient members, such as coil springs also can be used to bias the stylus supporting member 18 to a position away from base structure 16.

Figure 3:
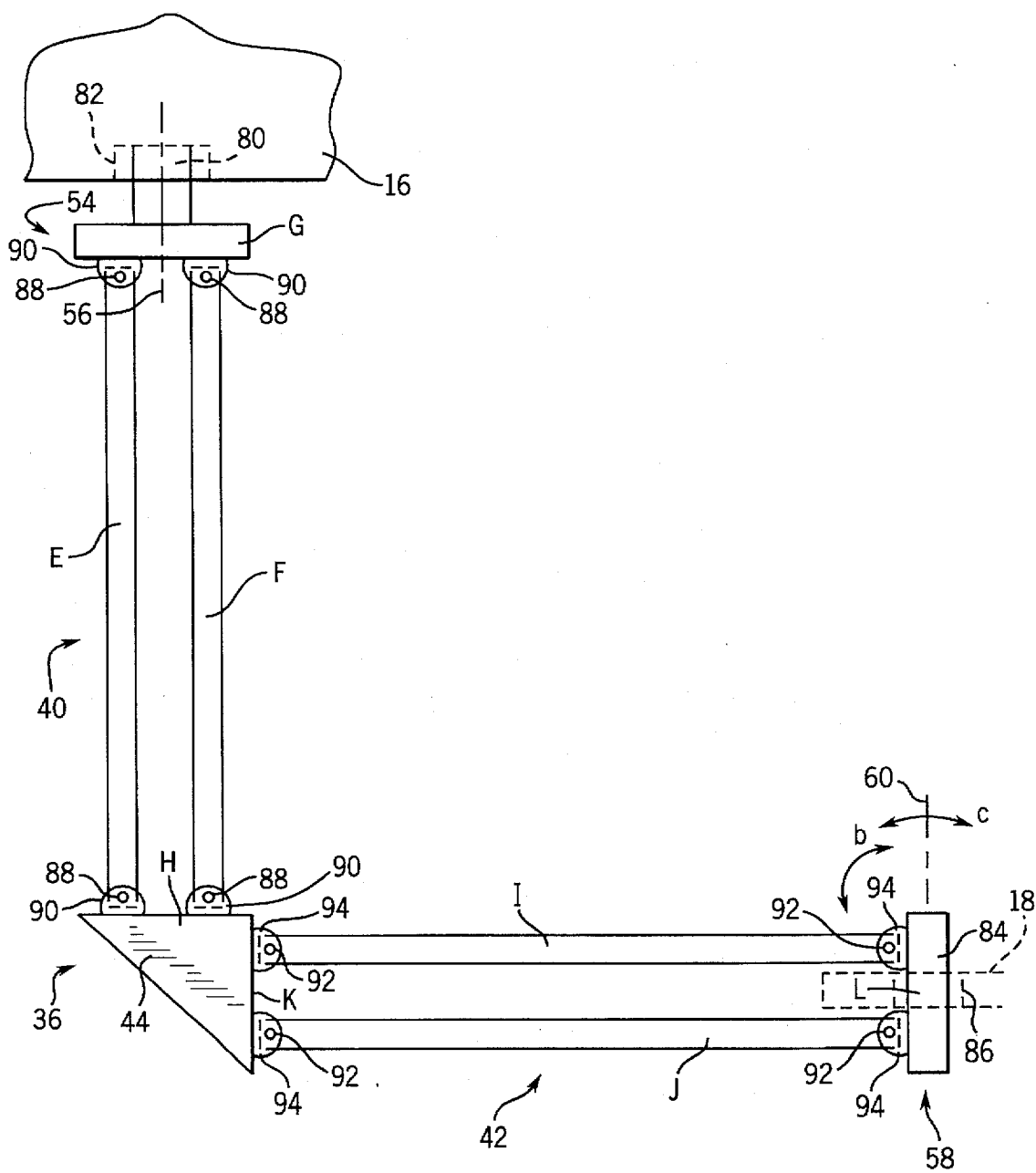
FIG. 3 is a side view of a preferred embodiment of one of the control arms illustrated in FIG. 1.

Referring to FIG. 3, the structure and function of each of the control arms can be explained with reference to a single control arm, specifically control arm 36. As explained above, control arm 36 is pivotably mounted to base structure 16 at its first end 54 and to stylus supporting member 18 at its second end 58. By way of example, first end 54 may include a pin 80 rotatably received by base structure 16 via a bearing 82. Similarly, second end 58 may include a pin 84 rotatably received through stylus supporting member 18 via a bearing 86. First end 54 and second end 58 can be attached to base structure 16 and stylus supporting member 18 in a variety of ways, but the mounting structure should permit only one degree of rotational freedom at each end. In other words, first end 54 is only allowed to rotate about axis 56 and second end 58 is only allowed to rotate about axis 60.

The first four-bar linkage 40 and the second four-bar linkage 42 of control arm 36 cooperate to prevent movement of stylus supporting member 18 along rotational axis b. The other control arms, 34 and 38, cooperate with control arm 36 to restrict movement of stylus supporting member 18 along all three rotational axes.

First four-bar linkage 40 includes four bars labeled as E, F and G H that are linked at four pivot points 88 by brackets 90. Bars E and F are parallel and of the same length. Thus, as attachment bracket 44 is moved with respect to first end 54, bars E and F remain parallel.

Similarly, second four-bar linkage 42 includes four bars labeled as I, J, and K, L that are connected at four pivot points 92 by brackets 94. Bars I and J are parallel and of the same length. Thus, as second end 58 is moved with respect to attachment bracket 44, bars I and J remain parallel. Because bars E and F of first for bar linkage 40 are parallel to each other and connected in series with the parallel bars I and J of second four bar linkage 42, forces acting on stylus supporting member 18 that tend to twist it along the b-axis are translated to base structure 16 through bars I, J and E, F in either tension or compression. Control arm 36, therefore, provides great rigidity and resistance to twisting motion along the b-axis.

Preferably, brackets 90 and 94 are designed to hold E, F and I, J respectively to one degree of rotational freedom about their respective pivot points 88 and 92. In other words, bars E, F and I, J remain substantially parallel with a common plane during movement.

Connecting first four-bar linkage 40, having parallel, equal-length bars E and F, with second four bar linkage 42, having parallel, equal-length bars I and J, as illustrated, insures that second end 58 and axis 60 always remain oriented in the same direction with respect to base structure 16 regardless of where stylus supporting member 18 is moved in three dimensional space. Thus, stylus supporting member 18 is restrained from any rotational motion, other than rotational motion about axis 60.

Similarly, control arm 34 maintains its second end 50 and axis 52 oriented in the same direction regardless of where stylus supporting member 18 is moved through three dimensional space. Control arm 38 also maintains its second end 68 and axis 70 oriented in the same direction with respect to base structure 16 regardless of where stylus supporting member 18 is moved in three dimensional space. The orientation of axis 70 is transverse to the orientation of axes 52 and 60, and therefore second end 68 is typically mounted to stylus supporting member 18 in a different manner than second end 50 and second end 58 of control arms 34 and 36, respectively. As illustrated in FIG. 1, second end 68 may include a pin 96 rotatably received in a pair of bosses 98 extending from stylus supporting member 18.

Figure 4:
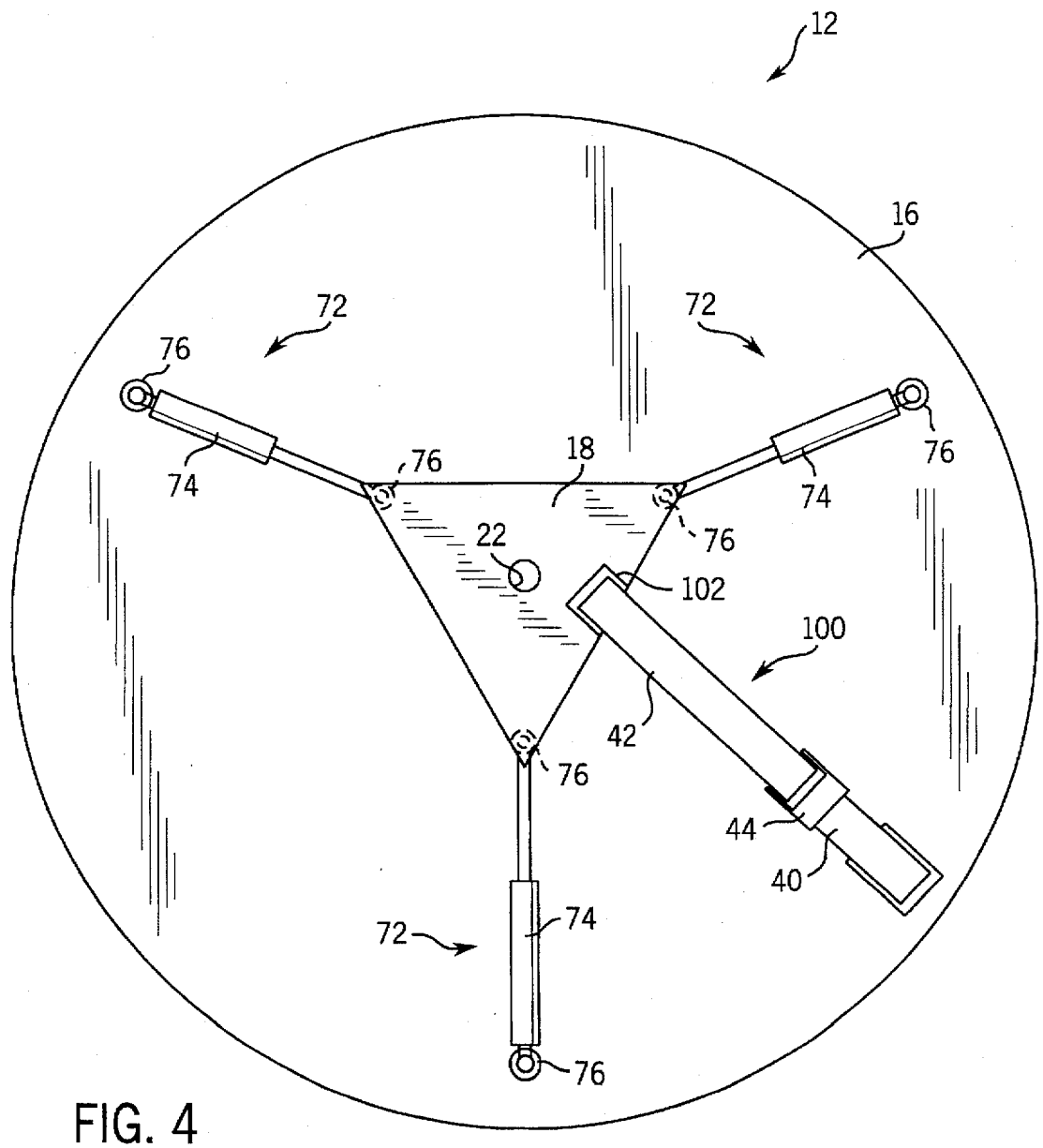
FIG. 4 is a bottom view of an alternate embodiment of the probe illustrated in FIG. 1.
Figure 5:
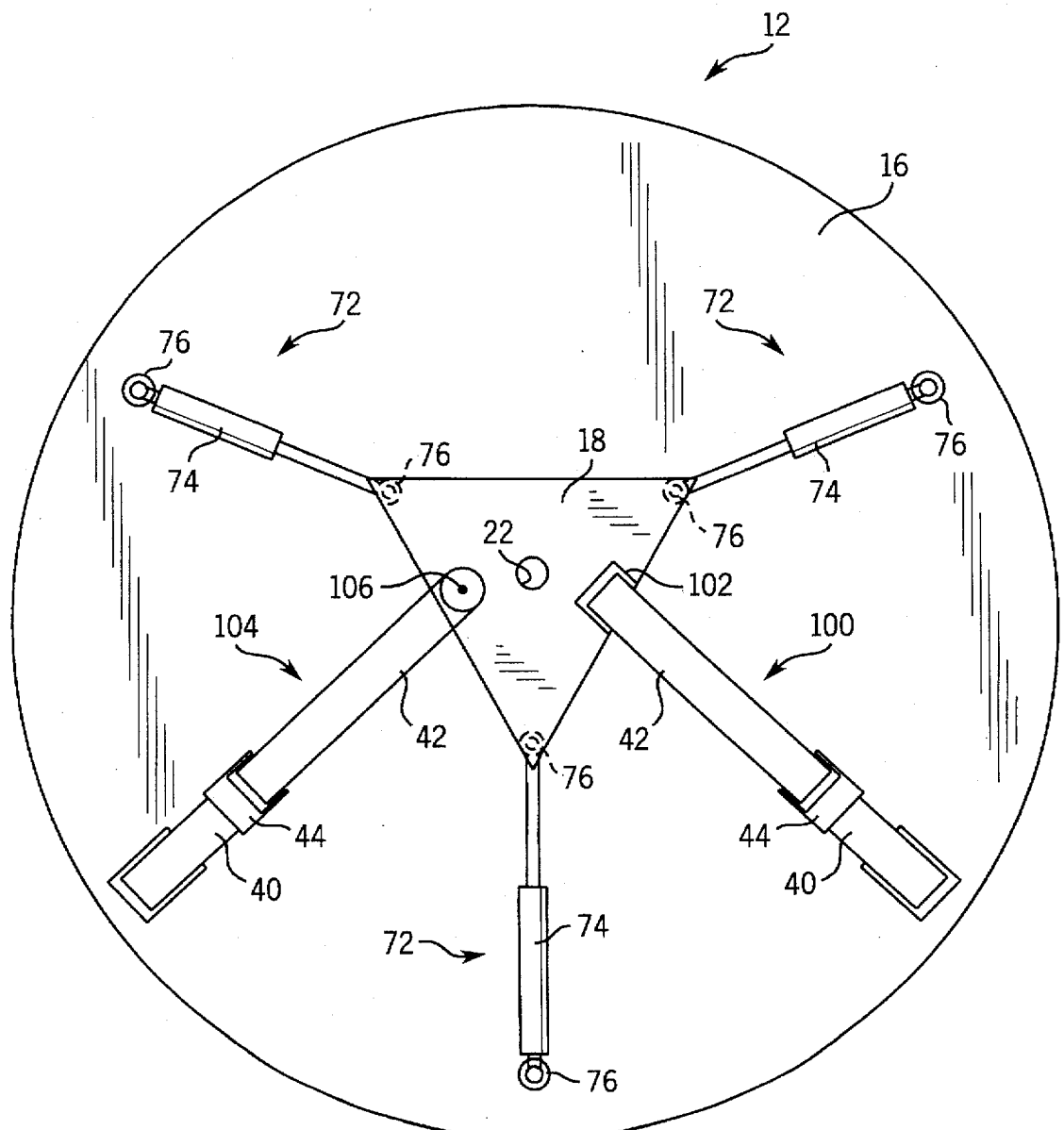
FIG. 5 is a bottom view of another alternate embodiment of the probe illustrated in FIG. 1.

Some applications of probe 12 may not require the rigidity provided by three control arms. Alternate embodiments of probe 12 are illustrated in FIGS. 4 and 5, where either one or two control arms are attached between base structure 16 and stylus supporting member 18. Referring specifically to FIG. 4, a single control arm 100 is connected between base structure 16 and stylus supporting member 18. In this configuration, control arm 100 preferably is rigidly affixed to stylus supporting member 18 at a location 102. By rigidly affixing control arm 100 to stylus supporting member 18, the control arm resists rotational movement of stylus supporting member 18 along all three rotational axes. This configuration, of course, provides the greatest rigidity with respect to forces that act through the four bar linkage of control arm 100 solely in compression and tension as described above. Other forces tend to put a bending or torsional force on the four bar linkages, but for certain applications the linkages could be designed with sufficient rigidity against those bending and/or torsional forces.

If greater rigidity is required to combat twisting of stylus supporting member 18, a second control arm 104 can be added as illustrated in FIG. 5. In this embodiment, control arm 100 is rigidly affixed to stylus supporting member 18, and control arm 104 is rotatably mounted to stylus supporting member 18 for a single degree of freedom of rotation about an axis 106. This configuration will provide great resistance to rotation of stylus supporting member 18 along rotational axes a and b, because the parallel bars of control arms 100 and 104 are placed solely in tension or compression by forces acting along those axes. However, if greater resistance to rotation along the c-axis is required, it will be necessary to provide a third control arm as illustrated in FIGS. 1 and 2. It should also be noted that in the embodiments illustrated in FIGS. 5 and 6, there will be a slight translation of stylus supporting member 18 along the c-axis as member 18 is moved along the x-y plane. This is due to the fixed attachment of control arm 100 to stylus supporting member 18.

Figure 6:
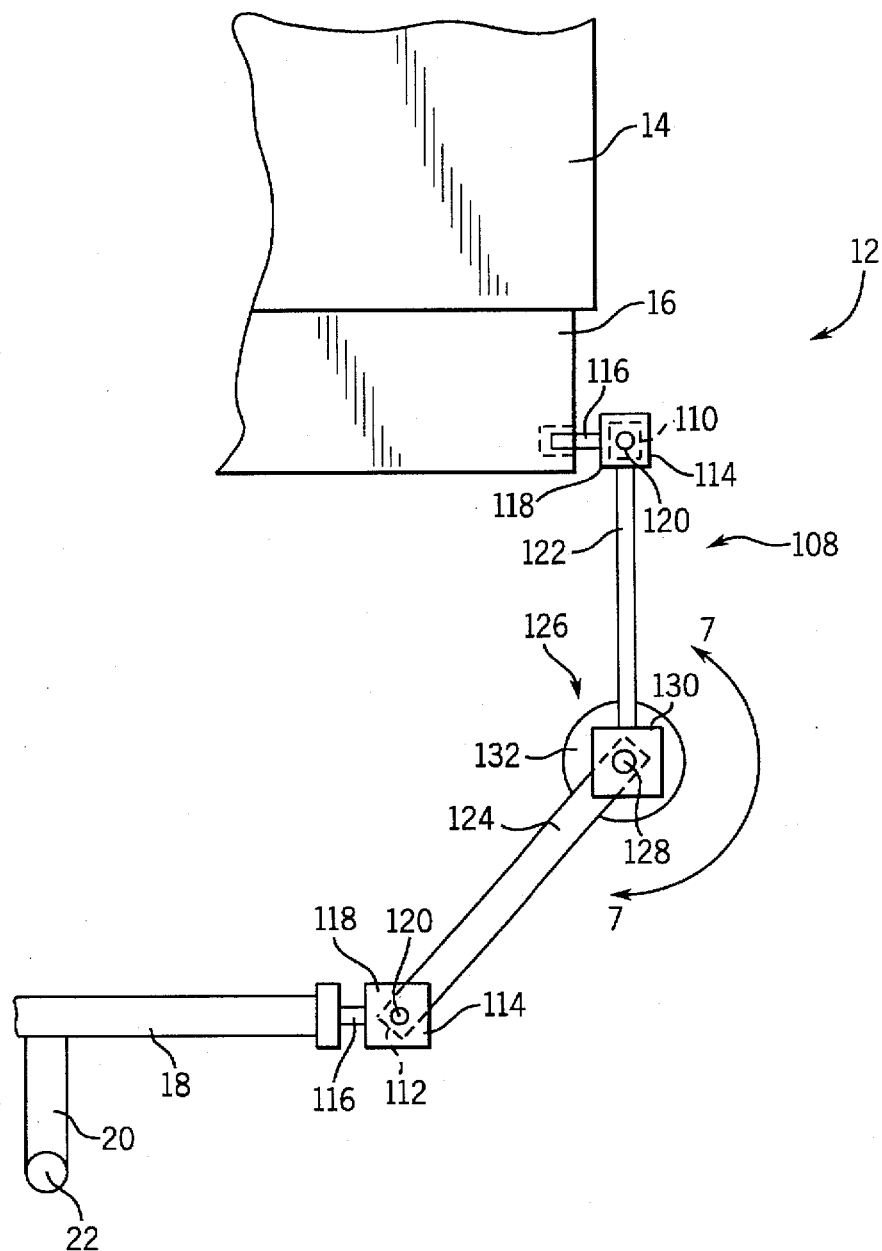
FIG. 6 is a front view of an alternate embodiment of the sensor leg.
Figure 7:
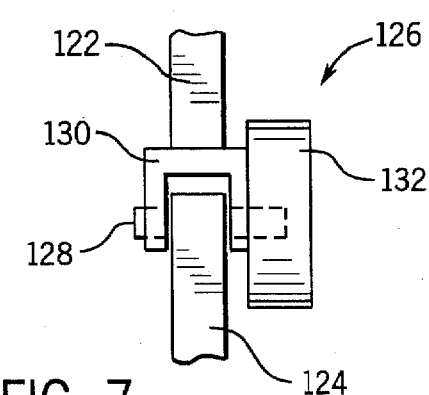
FIG. 7 is a partial side view of the sensor leg illustrated in FIG. 6.

Referring to FIGS. 6 and 7, an alternate embodiment of one of the sensor legs is illustrated. In this embodiment, the sensor leg, labeled as 108, is a hinged leg. Sensor leg 108 could be used to replace some or all of the sensor legs illustrated in FIGS. 1–5. Each sensor leg 108 includes a first end 110 pivotably connected to base structure 16 and a second end 112 pivotably connected to stylus supporting member 18. The first end 66 and second end 68 can be mounted to the base structure 16 and the stylus supporting member 18, respectively, by a pivot member 114 having two degrees of freedom. For example, each pivot member 114 can include a shaft 116 rotatably mounted to a side of the base structure 16 or stylus supporting member 18. A trunion 118 is affixed to the corresponding shaft 116 for pivotably receiving a corresponding end of sensor leg 108, i.e., first end 110 or second end 112, for rotational movement about a pin 120.

First end 110 is part of a first link 122 of sensor leg 108. Similarly, second end 12 is part of a second link 124 of sensor leg 108. First link 122 is pivotably connected to second link 124 at a hinge joint 126. In an exemplary embodiment of hinge joint 126, a pin 128 is affixed to second link 124 and rotatably mounted to a trunion or clevis 130 that is affixed to first link 122, as best illustrated in FIG. 7.

Each sensor leg 108 preferably includes a sensor 132 to sense the movement of first end 110 with respect to. second end 112. When three sensor legs 108 are connected between base structure 16 and stylus supporting member 18 at unique locations about the perimeters of base structure 16 and stylus supporting member 18, their relative position can be determined. This permits calculation of the exact position of sensing tip 22 relative to base structure 16 and, thus, relative to a desired datum. As described above, this precise positional calculation is possible because sensing tip 22 of stylus 20 is fixed with respect to stylus supporting member 18, and the position of moveable arm 14 relative to the datum is known via the coordinate positioning machine.

In a preferred embodiment, sensor 132 comprises an encoder attached to clevis 130 of each sensor leg 108 for cooperation with pin 128. Thus, any changes in the angle formed between first link 122 and second link 124 is sensed. The angles formed by the three sensing legs 108 can be used to calculate the position of stylus supporting member 18 with respect to base structure 16, and thus the position of sensing tip 22 relative to the desired datum. Alternatively, sensors could be applied to at least one pivot member 114 of each sensor leg 108 to determine position.

Figure 8:
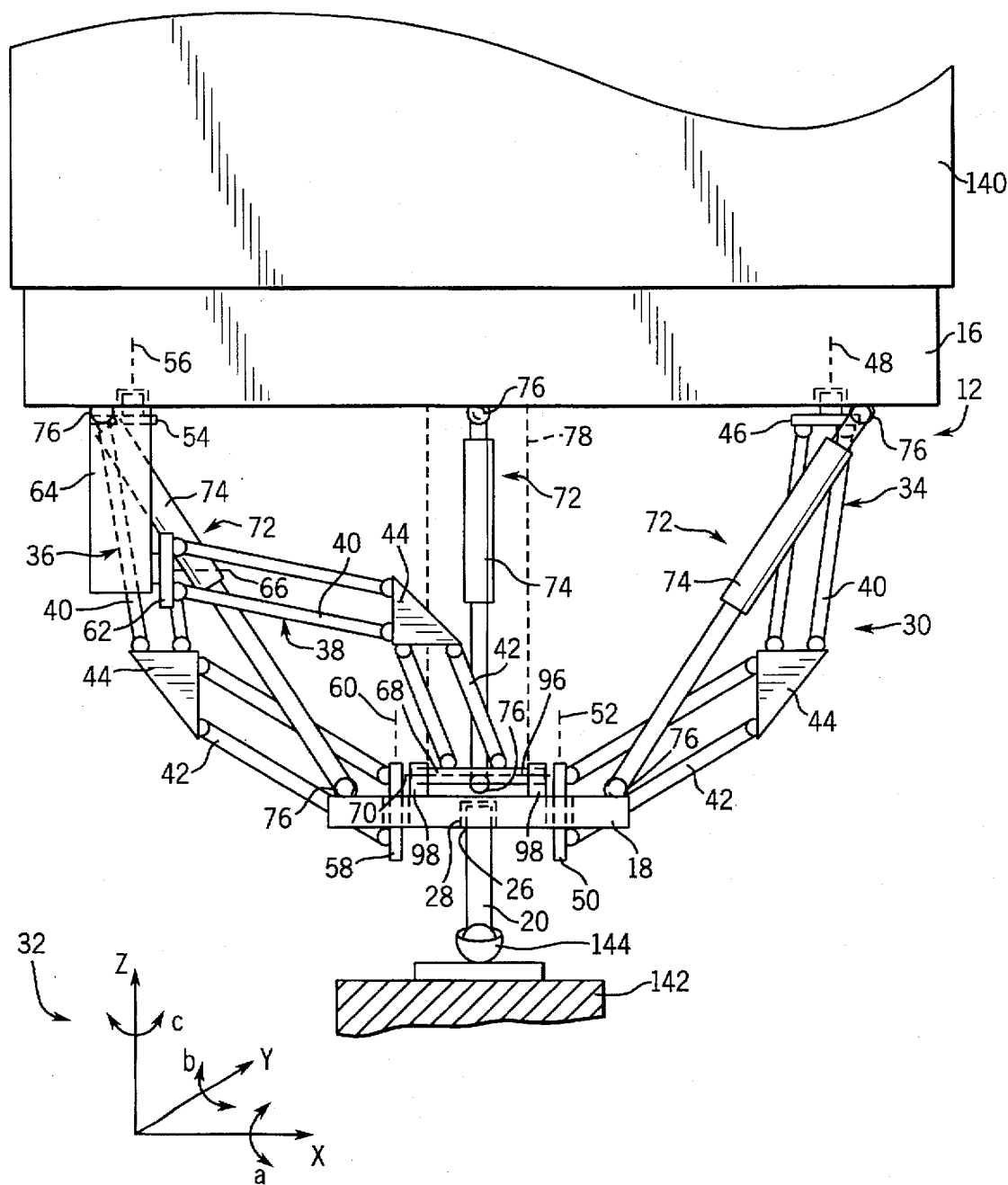
FIG. 8 is an alternate embodiment of the invention showing a three-axis sensor device connected between two structures.

Alternatively, as illustrated in FIG. 8, base structure 16 can be connected to or integrally formed with a reference structure 140. In this embodiment, supporting member 18 is connected to or formed as part of a second structure 142 to permit the tracking of movement of second structure 142 relative to reference structure 140. As illustrated, supporting member 18 could be connected to second structure 142 by stylus 20 or some other connecting member. Typically, the connector, e.g. stylus 20, would be pivotably mounted to second structure 142 by, for instance, a ball joint 144. The sensor assembly 72, e.g. sensor legs 74, can be used to detect continuously any movement of supporting member 18 relative to base structure 16 and reference structure 140. Thus, the movement of second structure 142, which is at a fixed position with respect to supporting member 18 (at least at the point of connection), can be tracked relative to reference structure 140.

It will be understood that the foregoing description is of preferred exemplary embodiments of this invention and that the invention is not limited to the specific forms shown. For example, a variety of sensor systems can be used to sense the position and movement of the sensing tip along three axes. Additionally, numerous types of permanent or replaceable styli can be used in different orientations with respect to the stylus supporting member. Further, the resilient member may be a plurality of members disposed inside the legs, on the legs or external to the legs. These and other modifications may be made in the design and arrangement of the elements without departing from the scope of the invention as expressed in the appended claims.

What is claimed is:

1. A probe for use in an environment where the motion of an object can be defined as movement along one or more of six axes of which three axes are linear axes and three axes are rotary axes, the probe being connectable to a coordinate positioning machine having a moveable arm, the probe comprising:

a base structure by which the probe may be mounted to the moveable arm;

a stylus supporting member;

a sensor assembly cooperating with the base structure and the stylus supporting member to sense movement of the stylus supporting member relative to the base structure; and a control system including at least one control arm connected to the stylus supporting member and to the base structure to permit movement of the stylus supporting member relative to the base structure along the three linear axes while restricting movement of the stylus supporting member relative to the base structure along the three rotary axes without flexure of the at least one control arm, the at least one control arm including a four bar linkage having a pair of rigid, equal-length, parallel bars.

2. The probe as recited in claim 1, wherein the at least one control arm includes a pair of four bar linkages connected in series, each four bar linkage having a pair of equal length parallel bars.

3. The probe as recited in claim 1, wherein the control system includes a pair of control arms, each control arm being connected to the stylus supporting member and to the base structure.

4. The probe as recited in claim 1, wherein the control system includes three control arms, each control arm being connected to the stylus supporting member and to the base structure.

5. The probe as recited in claim 4, wherein each control arm includes a four-bar linkage.

6. The probe as recited in claim 5, wherein each control arm includes a pair of four-bar linkages connected in series.

7. The probe as recited in claim 1, further comprising a resilient member to bias the stylus supporting member to a position away from the base structure.

8. A probe for use in an environment where the motion of an object can be defined as movement along one or more of six axes of which three axes are linear axes and three axes are rotary axes, the probe being connectable to a coordinate positioning machine having a moveable arm, the probe comprising:

a base structure by which the probe may be mounted to the moveable arm;

a stylus supporting member;

a sensor assembly cooperating with the base structure and the stylus supporting member to sense movement of the stylus supporting member relative to the base structure; and a control system including at least one control arm connected to the stylus supporting member and to the base structure to permit movement of the stylus supporting member relative to the base structure along the three linear axes while restricting movement of the stylus supporting member relative to the base structure alone the three rotary axes, wherein the sensor assembly includes a plurality of legs, each leg being pivotably connected to the base structure and to the stylus supporting member.

9. The probe as recited in claim 8, wherein the plurality of legs includes three legs.

10. The probe as recited in claim 9, wherein the three legs include a pair of members that are slidably engaged.

11. The probe as recited in claim 10, wherein the sensor assembly comprises an LVDT.

12. The probe as recited in claim 9, wherein the three legs include a pair of members that are pivotably engaged.

13. The probe as recited in claim 11, wherein the sensor assembly comprises an encoder.

* * * * *